E. S. RAFF.

INKSTAND.

No. 11,233. Reissued Apr. 26, 1892.

Witnesses.
E. Byron Gilchrist.
C. H. Woods

Inventor.
Edward S. Raff
By Legget & Legget
his Attorneys.

THE NORRIS PETERS CO., PHOTO-LITHO., WASHINGTON, D. C.

UNITED STATES PATENT OFFICE.

EDWARD S. RAFF, OF CANTON, OHIO.

INKSTAND.

SPECIFICATION forming part of Reissued Letters Patent No. 11,233, dated April 26, 1892.

Original No. 445,200, dated January 27, 1891. Application for reissue filed January 20, 1892. Serial No. 418,714.

*To all whom it may concern:*

Be it known that I, EDWARD S. RAFF, a citizen of the United States, and a resident of Canton, county of Stark, State of Ohio, have invented a new and useful Improvement in Inkstands, of which the following is a full, clear, and exact description, reference being had to the accompanying drawings, making part of this specification.

Figure 1:
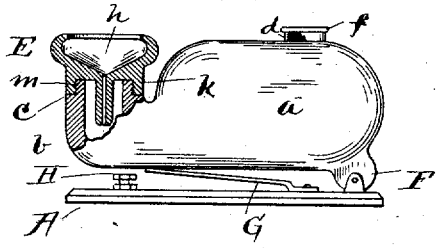

My invention relates to improvements in an article of manufacture; and it consists in providing in an inkstand a fountain or receptacle to hold ink, that may be vibrated about its pivotal connection with the base—that is, held in normal position by a spring that will yield when the pen is placed in the stand—which movement of the fountain will cause a supply of ink to flow from the body of the fountain to the pen and back into the fountain when the pen is removed, the spring raising the fountain into normal position, as shown in Figure 1, by which movement a fresh supply of ink is each time brought to the pen and the ink prevented from "settling" and is always in order for use.

With these ends in view my invention consists in certain features of construction and combination of parts, as will be hereinafter described, and pointed out in the claims.

Figure 2:
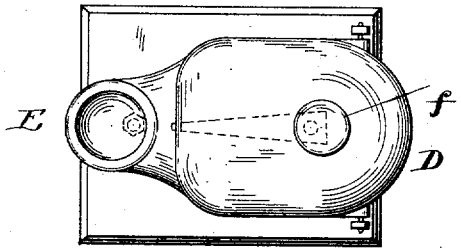
Figure 3:
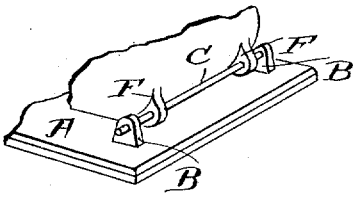

Fig. 1 of the accompanying drawings is a side elevation, partly in section, of an inkstand illustrating my invention. Fig. 2 is a plan view, and Fig. 3 a perspective, of a fragment, showing the rear lower portion.

A is the base, which may be made of any suitable material, having at its rear side portions upwardly-projected lugs B, through which is passed a bar C. A fountain or inkholder D, preferably made of glass, is provided, having a hollow body portion *a*, a neck portion *b*, projected outwardly and up, about the upper end portion of which is provided a screw-thread *c*, and on the top portion of the body D is provided a flanged aperture *d*, to which is fitted a metal cap *f*. A mouth-piece E, preferably made of hard rubber and of the form shown in the drawings, is provided, said piece having upwardly-projected walls *h*, a downwardly-projected neck portion *m*, having a screw-thread *k* similar and adapted to the thread *c* on the neck of the fountain, and a central and downwardly-projected tube portion *n*, the aperture of which is small, as shown.

At the rear lower portion of the fountain are provided lugs F, through which the bar C is passed, forming a hinged or pivotal connection between the fountain and the base. To support the front portion of the body of the fountain, a spring G is provided, one end of which is secured to the base A, the other or free end resting against the bottom of the fountain. The energy of the spring is to be adjusted to the size of the fountain and to yield to a gentle pressure of the pen and to raise the front end portion of the fountain to a normal position, as shown in Fig. 1.

In operation a sufficient amount of ink is passed through the aperture provided therefor into the fountain to immerse or cover the end of the tube *n* to a point indicated by the dotted line. To ink the pen, it is placed in the mouth E, and by a gentle pressure the spring G will yield to allow the fountain to tip and the ink to flow from the fountain to the mouth E, and when the pen is removed the spring will raise the front end of the fountain to its normal position. By keeping the end of the tube *n* constantly immersed air-bubbles rising above the tube into the mouth will be prevented, and by reason of the swinging movement of the fountain the ink is not liable to "settle," as in the case with a stationary fountain.

To prevent too great a movement and an overflow of ink, a stop, as H, is provided, by which the swing or downward movement of the front portion of the fountain may be arrested. Said stop, as shown, consists of a button-head screw, the threaded portion to be turned into or out of the base A.

What I claim is—

1. As an article of manufacture, an inkstand comprising an ink-fountain pivotally supported at or near one end, and a yielding support for yieldingly sustaining the free end of the ink-fountain, substantially as set forth.

2. As an article of manufacture, an inkstand comprising an ink-fountain pivoted at or near one end and yieldingly supported at the opposite end, and a stop located beneath the yieldingly-supported end of the fountain, where it will limit the downward movement of the fountain, substantially as set forth.

3. As an article of manufacture, an ink-stand comprising a supporting-base having a pair of upright frames or members, and an ink fountain or receptacle pivotally hung to and between said upright frames or members and adapted to tip or swing by a downward pressure of the pen on the mouth of the fountain, in combination with a spring acting in the direction to return the fountain to its normal position upon the removal of the pressure from the mouth of the fountain, and an adjustable stop located below the mouth of the fountain to limit the depression of the same, substantially as set forth.

4. As an article of manufacture, an ink-stand having a support consisting of a base A, said base having at one of its ends upwardly-projected lugs B, having at their top portion a cross-bar C, and a fountain D, having lugs F, by which said fountain is pivotally secured to said base to swing about said bar, a spring to support the front end of said fountain, and a stop H to arrest the downward movement of the fountain, substantially as described, and for the purpose set forth.

In testimony whereof I have hereunto set my hand this 7th day of December, 1891.

EDWARD S. RAFF.

Witnesses:

JAMES E. FLOHR,
ROBERT K. FAST.